March 3, 1953 L. W. BURCH ET AL 2,630,504
MOTION TRANSLATING DEVICE
Filed Nov. 29, 1950 3 Sheets-Sheet 1
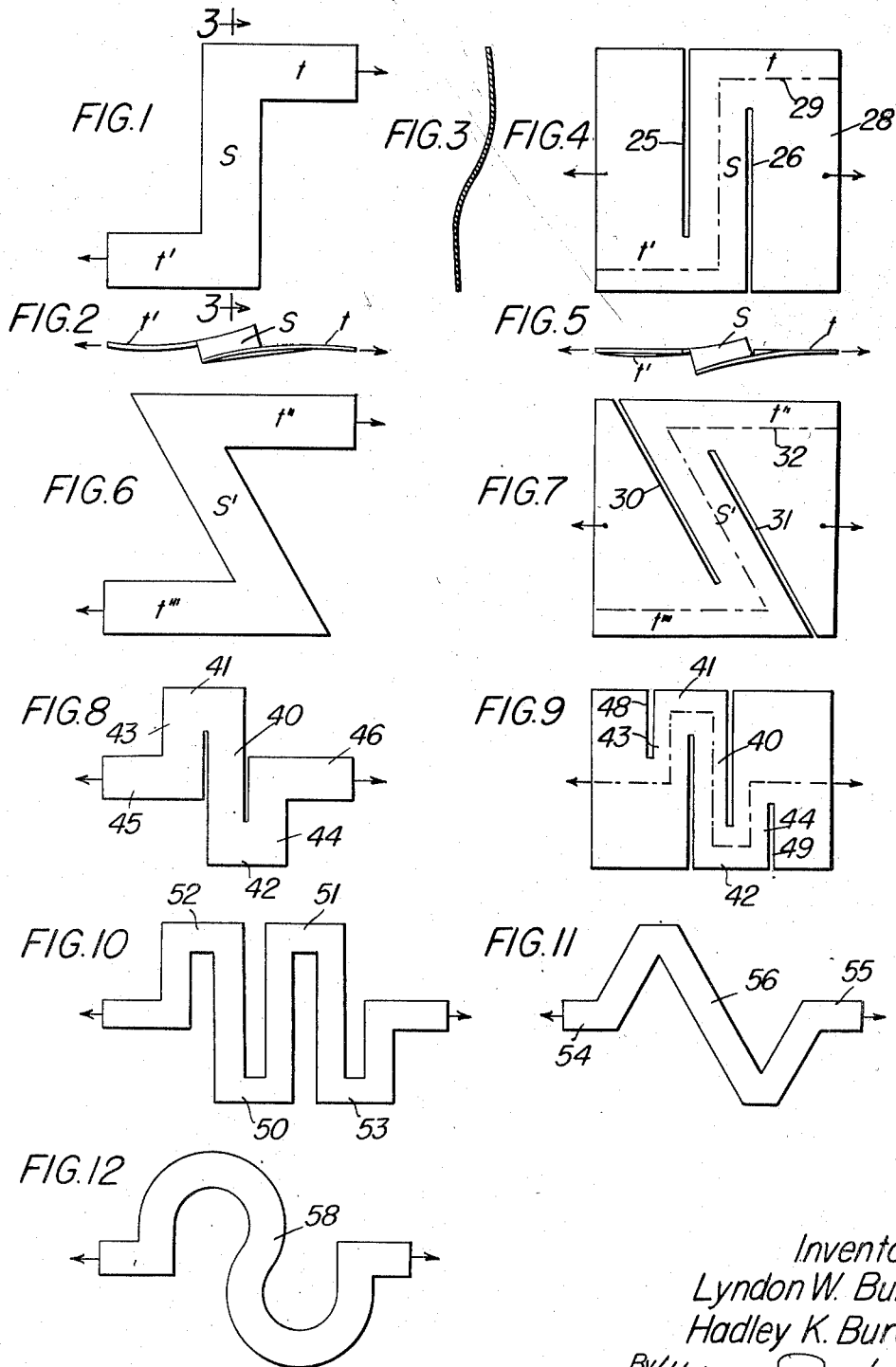
Inventors
Lyndon W. Burch
Hadley K. Burch
By Williams, Rich & Morse
Attorneys March 3, 1953     L. W. BURCH ET AL     2,630,504
MOTION TRANSLATING DEVICE
Filed Nov. 29, 1950     3 Sheets-Sheet 2

*Inventors*
*Lyndon W. Burch*
*Hadley K. Burch*
By Williams, *Rich & Morse*
*Attorneys*

March 3, 1953  L. W. BURCH ET AL  2,630,504
MOTION TRANSLATING DEVICE
Filed Nov. 29, 1950  3 Sheets-Sheet 3
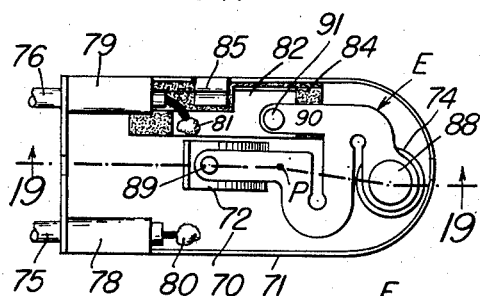
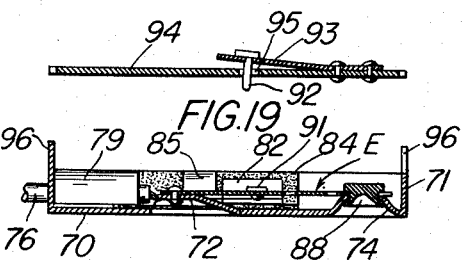
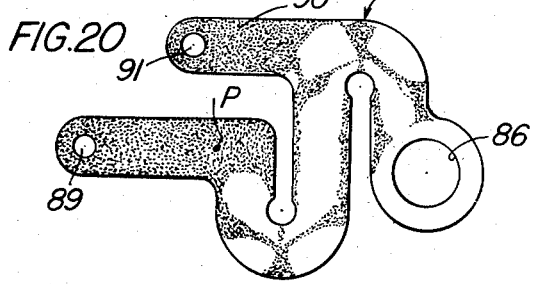
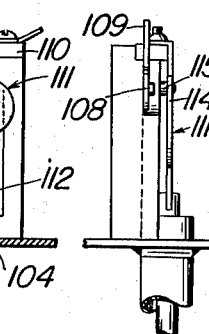
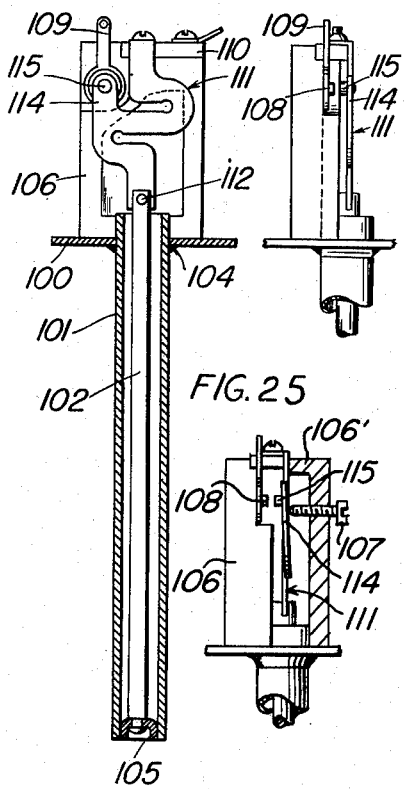
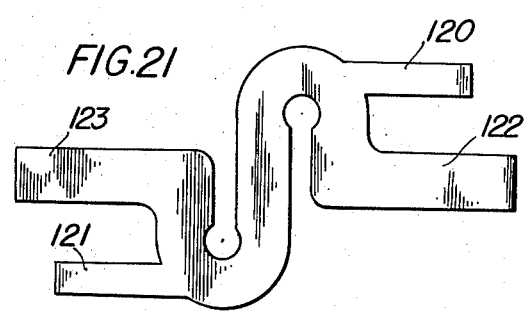
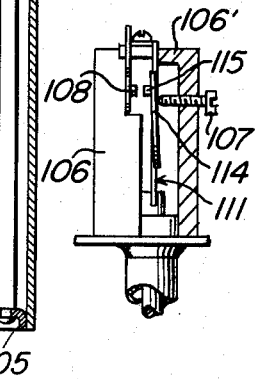
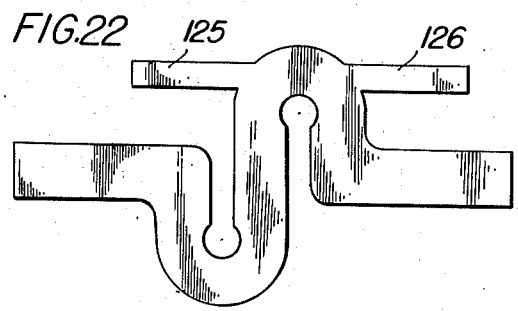
*Inventors*
Lyndon W. Burch
Hadley K. Burch
By Williams, Rich & Morse
*Attorneys*

Patented Mar. 3, 1953

2,630,504

UNITED STATES PATENT OFFICE 2,630,504

MOTION TRANSLATING DEVICE

Lyndon W. Burch, New York, N. Y., and
Hadley K. Burch, Danbury, Conn.

Application November 29, 1950, Serial No. 198,190

20 Claims. (Cl. 200—67)

This invention relates to the translation and amplification of motion and more particularly to mechanical devices for converting a small movement into a larger one.

The motion acting upon the device will be referred to as the "primary motion" and the movement produced in or by the device as the "secondary motion."

The novel devices of the invention, which in all cases are designed to amplify the primary motion, may produce secondary motion which in rate bears a definite relationship to the primary motion or which has a snap or over-center action. The motion translating elements hereinafter described are useful in a wide variety of devices such as electrical switches, thermostats, guages, indicators and other kinds of instruments and are unusually adaptable to differing design requirements.

In all embodiments of the device as hereinafter described use is made of the distortion produced in an initially flat piece of springy material, which has a high width-to-thickness ratio (sometimes denoted herein by the simple term "thin"), by externally applied stress.

While it is recognized that numerous devices, such as snap-action switches and the like, have made use of thin spring-metal elements placed under stress, it is believed that none has ever applied the stress in the manner or produced the type of action contemplated by this invention.

In its simplest or fundamental form the invention involves applying to a strip of thin springy material, preferably substantially longer than it is wide, negative stress or tension, applied at opposite ends of the strip, acting in opposite directions and at a substantial angle to the longitudinal axis of the strip, that is to say, laterally thereof. This externally applied stress sets up complex internal stresses resulting in distortion of the strip and consequent secondary motion which may be utilized. The strip may be either straight or curved and in the preferred embodiments of the invention a plurality of such distortable strips are present in an integral structure.

On the basis of this generalized statement the invention will now be more particularly described in conjunction with the drawings in which:

Fig. 1 shows in plan the simplest form of motion translating element with its integral tension members;

Fig. 2 shows the distortion produced when the member of Fig. 1 is under tension, as viewed from the top of Fig. 1;

Fig. 3 is a cross section on the line 3—3 of Fig. 1, under tension;

Fig. 4 illustrates an equivalent of the structure of Fig. 1 formed by slotting a rectangular sheet;

Fig. 5 shows the distortion produced in the structure of Fig. 4 as viewed from the top of Fig. 4;

Fig. 6 is a modification in which the angles between the strip and its tension members are less than 90°;

Fig. 7 is the slotted sheet equivalent of Fig. 6;

Fig. 8 is a further development of the basic structure in which the ends of the strip terminate in the integral loops at the ends of which are tension members which are in alignment;

Fig. 9 is the slotted sheet equivalent of Fig. 8;

Fig. 10 is a further development of the looped structure of Fig. 8 but having two integral, oppositely extending main loops;

Fig. 11 is a modification of the Fig. 8 structure in which the angles between the main strip and the tension strips are greater than 90°;

Fig. 12 shows an embodiment in which the strip is curved;

Fig. 17 is a plan view of a snap-switch with cover removed embodying an element of the Fig. 8 type with the addition of an amplifying lever;

Fig. 18 is a side elevation of the cover for the switch;

Fig. 19 is a sectional elevation on the line 19—19 of Fig. 18;

Fig. 20 shows an element similar to that in the switch of Fig. 17 made of transparent plastic as viewed under polarized light while under stress, stippling indicating the visible stress patterns;

Fig. 21 shows a double-loop element, basically of the Fig. 8 type, having single lever arms on both looped ends;

Fig. 22 shows a modification having double lever arms on one looped end;

Fig. 23 is an elevation, partly in section, of a rod-and-tube thermostat employing a motion translating element of the invention;

Fig. 24 is a partial side elevation of the same, viewed from the left of Fig. 23.

Fig. 25 shows a modification of Fig. 24 including a stop.

Figure 13:
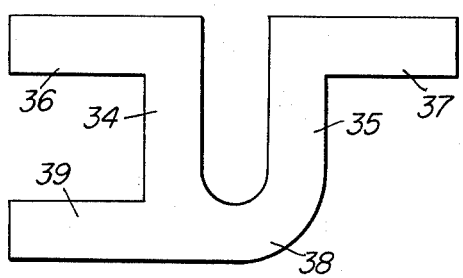
Fig. 13 shows two strips joined in a single loop having tension members at the ends of the loop and an amplifying lever on the looped end.

Referring to the drawings, Figs. 1, 2 and 3 illustrate the basic principle of the invention, although not its most practical embodiment. The motion translating element shown in Fig. 1 consists of a strip $s$ having integral tension members $t$ and $t'$ stamped from a thin sheet of springy material such as spring metal. The strip $s$ and the tension members have a high width-to-thickness ratio. For example, the strip $s$ may be about 20 to 25 times as wide as it is thick. The tension members are shown as having about the same width as the strip but the important point to note is that their junctions with the strip extend along substantial portions of opposite edges of the strip, at opposite ends thereof so that the tension is applied not at a point but along a portion of the imaginary edge of the strip. When tension is applied to the members $t$ and $t'$ in opposite directions, as indicated by the arrows, extending from the diagonally opposite edges of these members, the entire element distorts as indicated in Figs. 2 and 3. Tension applied as indicated would, of course, tend to rotate the element about the center of strip $s$ unless the means of applying such tension is so arranged as to prevent this rotation. It should be assumed, in all cases hereinafter described where tension is applied in a line not passing through the center of the element, that means are provided for preventing any such rotation. This may be accomplished by securing the tension members $t$ and $t'$ so that they can move only in straight lines in the direction of the arrows. It will be observed from Fig. 2 that under tension the tension members $t$ and $t'$ are slightly bowed, the upper and lower ends of the strip $s$ moving to opposite sides of the plane occupied by the element when it is not under stress. The stress produces in the strip $s$ a complex curve, a cross-section through the center of the stressed strip having approximately the configuration shown in Fig. 3. In other words, stress aplied in the direction of the arrows and producing a very slight degree of primary motion results in the warping of the strip $s$ and adjacent portions of the tension members out of a plane, producing a much greater amount of secondary motion, particularly at the ends of the strip. It is this warping motion which is utilized in the numerous practical applications of the translating element of the invention, some of which will hereinafter be described. In general the warping motion is most readily made use of, and further amplified, by attaching to or forming integral with that part of the strip which has the most warp an arm or lever extending laterally thereof, as is more particularly described hereinafter.

Figs. 4 and 5 illustrate the fact that the equivalent of the element shown in Fig. 1 may be produced merely by providing two slots in a rectangular sheet of thin springy material. Cutting of the slots 25 and 26 in the sheet 28 brings into existence a motion translating element identical with that of Fig. 1 as may be seen by following the course of the broken line 29, the corresponding parts being indicated by the same reference characters. With this structure it is possible to apply tension as indicated by the arrows in a straight line passing through the center of the element, thus avoiding any tendency of the element to rotate. Substantially the identical distortion takes place under stress, as shown in Fig. 5, the unremoved segments of material lying outside of the slots 25 and 26 having little or no effect except to impart slightly greater rigidity to the tension members $t$ and $t'$.

Fig. 6 shows a modification of the structure of Fig. 1 in which the strip $s'$ is joined to its integral tension members $t''$ and $t'''$ at an angle of less than 90°. Substantially the same type of warping will take place under tension applied in the direction of the arrows as that just described.

In Fig. 7, the equivalent structure is shown as produced by slotting a sheet at 30 and 31, the path of the portion which is effective in translating motion being indicated by the broken line 32.

Figure 14:
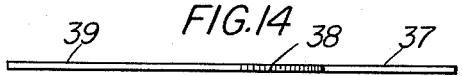
Fig. 14 is an edge view of the Fig. 13 structure in unstressed condition.
Figure 15:
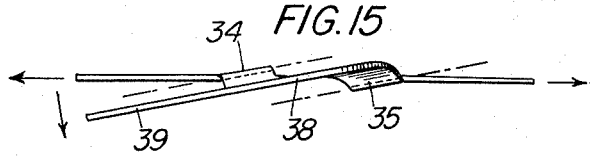
Fig. 15 is a corresponding view showing the stressed condition.

Referring now to Figs. 13, 14 and 15, a U-shaped element is shown having parallel legs 34 and 35 with integral tension members 36 and 37, the loop portion 38 having an integral amplifying arm or lever 39. As shown in Fig. 14, this element in an unstressed condition lies in a plane. However, when tension is applied to the members 36 and 37 in opposite directions along a straight line as shown in Fig. 15 by the arrows which extend to the right and left, the two legs 34 and 35 are warped out of the plane in opposite directions, throwing the loop 38 at an angle to the plane and moving the end of lever arm 39 out of the plane by a substantial distance as shown by the downwardly extending arrow. The amplification factor is very high. That is to say, the movement of the end of arm 39 may be ten times the elongation of the element in a structure such as that shown and this factor can of course be increased by increasing the length of arm 39. Each of the legs 34 and 35 warps in substantially the same manner as do the single strips $s$ and $s'$ in Figs. 1, 4 and 6. Taking the leg 34 as an example, it has the tension member 36 at its upper end and the loop 38 acts as the tension member at its lower end so leg 34 behaves like strip $s$, of Figs. 1 to 5. Similarly with leg 35 which has at its upper end the tension member 37, the loop 38 acting as the tension member at its lower end. In effect, therefore, the integral structure comprising member 36, leg 34, loop 38, leg 35 and member 37 behaves under tension like two elements of the Fig. 1 type joined together, one of the elements being turned over with the adjacent tension members being united, in effect, to form the loop 38. This loop portion 38, being unrestrained, twists at an angle to the plane of the unstressed element as clearly appears in Fig. 15, leg 34 warping downwardly and leg 35 warping upwardly. Arm 39, extending tangential to the loop, in effect extends laterally of leg 34, which corresponds in its action to strip $s$ of Fig. 1.

In Fig. 8 an element is shown which incorporates two integral loops having a long common central leg or strip 40, loop portions 41 and 42, shorter outer legs 43 and 44 and integral laterally extending members 45 and 46. When this element is placed under tension as shown by the arrows the loop portions 41 and 42 will warp at an angle to the plane of the unstressed element, each in a manner similar to that shown in Fig. 15 and this motion may be utilized by attaching to or forming integral with one or both of the loop portions lever arms of any desired length or configuration. In this structure the strip 40 corresponds to the strips $s$ and $s'$ of Figs. 1–7 and the tension members consist respectively of the leg 43 and member 45 on one side and the leg 44 and member 46 on the other side. Due to the alignment of members 45 and 46, tension applied through them does not tend to rotate strip 40. Hence substantially this arrangement of tension members is generally preferred.

Referring to Fig. 9, which shows an equivalent structure produced by slotting a sheet, it will be noted that the parts 40, 41 and 42 are the equivalent of the elements of the structure shown in Figs. 1 and 4, 40 corresponding to $s$, 41 to $t$ and 42 to $t'$. However, the existence of the outer legs 43 and 44, produced in the slotted sheet version by the slots 48 and 49 respectively, considerably reduces the rigidity of the strip 40 giving it increased freedom of movement and resulting in a greater amplitude of movement. Such increases may be further augmented by increasing the number of loops as shown in the structure of Fig. 10, in which there are two long loops 50 and 51 integral with two shorter loops 52 and 53. The freedom and amplitude of movement may be further increased by reducing the width of the loops as shown in this embodiment, particularly in their end portions surrounding the ends of the slots.

Fig. 11 shows a double looped structure in which the angle between the two tension members 54 and 55 (as extended) and the center strip 56 is greater than 90°. As this angle is increased, however, the amplification factor is reduced but an element of this form operates in accordance with the same basic principle.

Fig. 12 shows a double looped structure in which the central strip 58 is curved for the purpose of illustrating the fact that the specific shape of this strip, which is distorted by tension in the manner above described, is not particularly important. That is to say, it need not be straight as in Figs. 1 to 11 but may itself be curved.

Figure 16:
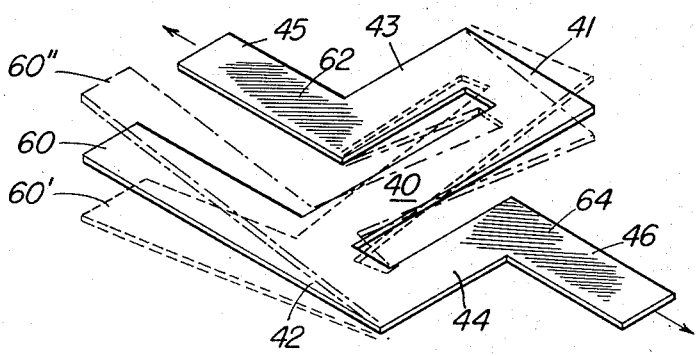
Fig. 16 is a perspective view of an element of the type shown in Fig. 8 with an amplifying lever added and showing the unstressed or plane form in full lines and the two stable positions of the element under stress in broken and dotted lines.

Fig. 16 shows a structure corresponding in type to that of Fig. 8 and while the relative dimensions of the parts are somewhat different, the same reference characters used in Fig. 8 have been applied thereto for purposes of identification. To the Fig. 8 structure, however, an amplifying arm 60 has been added as an integral part of the loop 42. The purpose of Fig. 16 is to illustrate the two stable positions which the motion translating element may assume when tension is applied in a direction tending to elongate the element along the axis of the tension members 45 and 46. In the full line position, which is the unstressed position, the element lies in a plane but when placed under stress it may move either to the position shown in dotted lines, in which the arm 60 moves to the 60' position, or to the position shown in broken lines, in which the arm 60 moves to the 60'' position. As previously indicated, the movement of the end of arm 60 (secondary motion) will be many times the elongation of the element as a whole (the primary motion). Assuming the ends of the tension members 45 and 46 to be secured in the plane occupied in their unstressed position, while the element is under stress and warped out of the plane it can be used as a snap-action or overcenter device by pressing on it in a direction normal to the plane of the element in a direction tending to move it from one of its stable positions to the other. Such pressure may be most effectively applied in one of the shaded areas 62 or 64 because a very slight movement in either of these areas will produce a full swing of the element from one stable position to the other.

The precise point within the shaded area where the greatest amplification of the pressing movement may be obtained depends upon the mounting of the element and other factors and is readily determined by experimentation. The selection of this position will also vary the pressure required to produce the snap action.

Summarizing the description of the invention as it has thus far progressed, Figs. 1–5 illustrate the motion translating element of the invention reduced to its simplest or fundamental form, in which the element is a single flat strip of thin springy material, longer than it is wide, to which tension is applied adjacent opposite ends, in opposite directions and at a substantial angle to the longitudinal axis of the strip. Figs. 6 and 7 illustrate the fact that the said substantial angle at which tension is applied may be less than a right angle. Fig. 11 illustrates the fact that said angle may be greater than a right angle. Figs. 13–15 illustrate the next step in the development of the elementary forms of Figs. 1–7 into a more complex structure wherein two strips are combined, in effect, to produce an element having the form of a single loop comprising two thin strips, the two legs of the loop warping under tension, applied simultaneously to opposite ends of each of the legs, which warping of the strips or legs twists the loop portion at an angle to the flat plane of the unstressed element. Figs. 8 and 9 illustrate the third step in the development wherein the element comprises two oppositely extending loops with a center leg in common, each of the loops having the action of the single loop of Fig. 13 and the element as a whole having greater freedom of motion. Fig. 10 shows an increased number of loops. Figs. 11 and 12 are functionally the equivalents of Fig. 8 and illustrate the fact that the loops may vary in shape without change in function. Fig. 12 further shows that the warpable strip, which is common to both loops, need not be straight and this is true also of the single strip structures of Figs. 1–7. Fig. 16 shows how, under tension, any one of the above described elements will have two normally stable positions in which any given point which moves under tension will be at rest on opposite sides of the plane of the unstressed element. Figs. 13–16 illustrate the use of an amplifying lever arm for increasing the usable movement produced by the placing under warping tension, in the manner described, of the normally flat strip or strips of springy material. It should be noted that each of the elements of Figs. 1 through 16 comprises one or more strips corresponding to and having the action under stress of the strip $s$ of Fig. 1. In all cases, it is the motion produced by the warping of this strip, in response to primary motion, which is utilized for motion translation; and regardless of the form of the element of which this strip is a part, the translated or secondary motion may be amplified through the use of a lever arm. While the use of a lever for amplifying motion is of course not in itself new, the means by which the lever is caused to move constitutes the essence of the present invention.

In translating the primary or applied motion into the secondary or resultant motion, the primary motion may be either: (a) the motion which produces the tension which in turn produces the warping of the element; or, (b) the tension may be pre-established, so that the motion translating element is initially warped in one direction, in which case the primary motion is so applied as to cause the element to warp, with a snap-action, in the opposite direction, thus producing the secondary motion. It will also be apparent that the device may be so applied as to combine the actions explained above under (a) and (b), producing for example first a relatively slow movement into warped position followed by a snap-action produced by reversing the warp.

Coming now to certain illustrative practical applications of the motion translating element of the invention, reference is made to Figs. 17 and 19 which show a snap-action switch embodying the element as one of the contact members. The switch is housed in a shallow stamped sheet metal case having a bottom 70 and side walls 71. In the center of the case a tongue 72 is punched upwardly at an angle and near the right-hand end the case is provided with a perforated upstanding boss 74. Insulated wires 75 and 76 enter the case where they are held by bent-over ears 78 and 79. The wire 75 is soldered to the bottom of the case at 80 and the wire 76 is soldered at 81 to a fixed contact plate 82 which rests on a layer of insulation 84 and is held in place by the bent-over ear 85. The motion translating element, which is of the double loop type illustrated in Figs. 8 and 16, is generally indicated at E and shown on an enlarged scale in Fig. 20. At one end it has a perforation 86 by which it is secured to the boss 74 by a rivet 88. The other end of the element is anchored by a rivet 89 or by a spot weld or the like to the upstanding end of the tongue 72. After this assembly is made, the tongue 72 is depressed slightly which, because of its angular position, places the element E under tension which warps it. This also throws the end of the element attached to tongue 72 below its initial plane and the warping of the element causes the end of the lever arm 90 to move downwardly, pressing the contact 91 carried thereby against the fixed contact plate 82. This plate is so positioned that it acts as a stop for lever arm 90 so that contact 91 engages plate 82 before arm 90 reaches the downwardly warped stable position to which it would move if unrestrained. Thus contact 91 may be made to engage plate 82 with considerable pressure to maintain the contacts closed even when the switch is subjected to high inertia forces. Due to the fact that one of the attached ends of the element is permanently secured out of the normal plane of the element it will always tend to warp in this one direction. This warping can be temporarily reversed to lift the arm 90 away from the contact plate 82 by pressing on the element in the vicinity of the point P but when this pressure is released, the element will snap back to its contact closing position due to its manner of mounting. Pressure may be applied to point P from above by means of an actuating pin 92 attached to a light leaf spring 93 secured to a cover plate 94 so that the pin extends through a hole 95 in the cover, as shown in Fig. 18. This cover rests upon the upstanding side walls 71 of the switch where it may be secured by bending down the ears 96. It will be evident that pressing down on pin 92 causes contact 90 to snap up and open the contacts in the structure illustrated. If the fixed contact is placed above instead of below contact arm 90, it is obvious that a normally open switch will result which will be closed by pressure on pin 92.

Such a switch as that just described may be made with very small dimensions, a switch which is actually in production being only half the size of the illustrations in the original drawings.

In Fig. 20 the enlarged illustration of the motion translating element is stippled to show the stress pattern which appears in a transparent replica of the element as seen in polarized light while under a stress comparable to that applied to it as mounted in the switch. From this it may clearly be seen that across the center of each of the loops, which act as tension members on the center strip with the opposite ends of which the loops are integral, the material is under compression on the outside portions of the loops and under tension on the inside and that stresses are set up in adjoining portions which produce warping.

From the explanations given above it will be evident that when stress is applied to an element like that shown in Fig. 20, its arm 90 will move to one side or the other of its normal plane, and if the element is arranged so as to be subject to variable stress, this motion of the arm will take place at a rate which bears a definite relationship to the movement produced by the externally applied stress. By mounting the two ends of the element out of alignment or by initially straining the element, it can be so arranged that the movement always takes place on the same side of its normal plane. In Figs. 23 and 24 another application of the motion translating element is illustrated in which such a slow-motion action may be utilized. The drawings show a thermostat of the well known rod and tube type having a mounting plate 100, a tube 101 and a rod 102. The tube 101 is secured to the plate 100 as by brazing at 104 and the rod and tube are connected at their outer ends by means of a cup 105 which is brazed to the tube and riveted to the rod. Also secured to plate 100 is a block of dielectric material 106 which carries a fixed contact 108 having a terminal 109. A metal block 110 is mounted in the top of the insulating block 106 and to it is attached one end of the motion translating element 111. The other end is attached to the top of the rod at 112. It will be understood that the rod and tube have different thermal coefficients of expansion so that upon a change in ambient temperature relative movement takes place between them, thus subjecting the element 111 to variable stress. This causes the arm 114 to move toward and away from the fixed contact 108 closing and opening the gap between contact 108 and a second contact 115 carried by the arm. Fig. 25 shows a modification in which block 106 has secured to it a cover 106' in which is threaded screw 107 to bear against arm 114, the screw being so adjusted as to assure that tension applied to element 111 will move arm 114 toward contact 108.

Fig. 21 illustrates a motion translating element of the double loop type in which each of the loops is provided with a lever arm as shown at 120 and 121, these arms extending in the same directions as the tension members 122 and 123 respectively. Such a member may be used to actuate two pairs of contacts simultaneously, either by slow motion or snap-action, depending upon its manner of mounting.

Fig. 22 shows a further modification in which two arms are applied to one loop as shown at 125 and 126, it being understood that when one arm moves upwardly the other will move downwardly. The lever arm is most advantageously positioned so that it extends downwardly from that side of a loop which corresponds to the position of the arm 125 since such an arm will have a somewhat greater amplitude of movement for any given degree of stress than an arm positioned as is the arm 126, due to the nature of the warping which occurs in the loop. It will be observed that the positioning of the arm 90 in Fig. 20 corresponds to that of the arm 125 in Fig. 22. In the simpler structures of Figs. 1 and 6 the lever arm extensions would obviously be applied at the points of maximum warp which would be at or near the ends of the strips s or s' and extending laterally in the opposite directions from the tension members t, t', t'' and t'''.

When an element such as that illustrated in Fig. 20 is mounted in mechanism capable of applying tension to it, it can be caused to warp under stress invariably in the same direction by placing a stop on one side of its lever arm which pushes it slightly out of its normal plane in the direction in which it is desired to have it move. Such a stop is shown in Fig. 25 in the screw 107, as above described. If such element is placed under constant tension to move the arm away from the stop and a means is provided for pressing against it in the vicinity of the point P in a direction to reverse the warp and throw the arm back against the stop, an element having the configuration shown in Fig. 20 is capable of producing an amplification of the primary motion at point P, in the form of lateral motion at the end of arm 90, of 20 or 30 to 1. Such action will be a snap-action and it is quite feasible to construct such elements in a wide range of sizes which can be actuated by primary motion at point P of as little as .002". The advantage of switches and the like capable of actuation by such slight movement is obvious. Another advantage of the elements herein described is that they can be greatly over-stressed by the primary motion used to actuate them without damage. Obviously, the motion translating elements of this invention may be constructed by simple blanking out procedures from any suitable sheet material and they may, therefore, be manufactured very cheaply.

It is to be understood that the invention is not limited to the details of the illustrative embodiments particularly described herein but that various modifications may be made without departing from the invention as defined in the claims.

What is claimed is:

1. A motion translating and amplifying device comprising, a thin strip of springy material substantially longer than it is wide, a first tension member integral with said strip extending laterally of the strip at one end thereof, a second tension member integral with said strip and extending laterally of the strip at the other end thereof and oppositely to said first tension member, said tension members having substantial width as measured along portions of the imaginary edges of the strip, an amplifying arm extending laterally of said strip adjacent one end thereof adapted to be moved by warping of said strip produced by stress applied through said tension members, and means for applying stress through said tension members at a substantial angle to the longitudinal axis of the strip.

2. The device of claim 1 wherein said amplifying arm is integral with said strip.

3. The device of claim 1 wherein said tension members form with said strip two oppositely extending loops of which said strip forms a common leg.

4. The device of claim 3 wherein an amplifying lever extends from each of said loops, said levers extending in opposite directions.

5. The device of claim 1 wherein at least one of said tension members forms with said strip a loop.

6. The device of claim 5 wherein said one of said tension members terminates opposite the middle of said strip.

7. The device of claim 5 wherein said one of said tension members has a portion which extends parallel to said strip and terminates in alignment with the end thereof opposite the end to which it is attached.

8. The device of claim 5 wherein said amplifying arm extends from said strip adjacent said loop in a direction opposite to the adjacent tension member.

9. The device of claim 5 wherein said amplifying arm extends from said loop in the same direction as the adjacent tension member.

10. A motion translating and amplifying element comprising, a thin strip of springy material substantially longer than it is wide, a first tension member integral with said strip extending laterally of the strip at one end thereof, a second tension member integral with said strip and extending laterally of the strip at the other end thereof and oppositely to said first tension member, said tension members having substantial width as measured along portions of the imaginary edges of the strip, and an amplifying arm extending laterally of said strip adjacent one end thereof adapted to be moved by warping of said strip produced by stress applied through said tension members.

11. A snap switch comprising, a thin strip of springy material substantially longer than it is wide, a first tension member integral with said strip extending laterally of the strip at one end thereof, a second tension member integral with said strip and extending laterally of the strip at the other end thereof and oppositely to said first tension member, said tension members having substantial width as measured along portions of the imaginary edges of the strip, a contact arm extending laterally of and carried by said strip adjacent one end thereof adapted to be moved by warping of said strip produced by stress applied through said tension members, means for rigidly supporting said strip under tension comprising spaced apart supports adapted to hold said tension members in two different planes whereby said arm is deflected by the warping of said strip in one direction, means for pressing on one of said tension members to warp the strip in the opposite direction to reverse the deflection of said arm, and a fixed contact adapted to be engaged by said arm in one of its deflected positions.

12. A snap switch comprising, a thin strip of springy material substantially longer than it is wide, a first tension member integral with said strip extending laterally of the strip at one end thereof, a second tension member integral with said strip and extending laterally of the strip at the other end thereof and oppositely to said first tension member, said tension members having substantial width as measured along portions of the imaginary edges of the strip, a contact arm extending laterally of and carried by said strip adjacent one end thereof adapted to be moved by warping of said strip produced by stress applied through said tension members, a fixed contact adapted to be engaged by said arm, means for rigidly supporting said strip under tension comprising spaced apart supports adapted to hold said tension members in spaced apart planes whereby said arm is deflected by the warping of the strip into engagement with said fixed contact, and means for pressing on one of said tension members to warp the strip in the opposite direction to separate said arm from said fixed contact.

13. A motion translating and amplifying switching device comprising, a thin strip of springy material substantially longer than it is wide, a first tension member integral with said strip extending laterally of the strip at one end thereof, a second tension member integral with said strip and extending laterally of the strip at the other end thereof and oppositely to said first tension member, said tension members having substantial width as measured along portions of the imaginary edges of the strip, a contact arm extending laterally of and carried by said strip adjacent one end thereof adapted to be moved by warping of said strip produced by stress applied through said tension members, means for applying variable stress through said tension members to said strip to deflect said arm, a fixed contact adapted to be engaged by said arm in its deflected position, and stop means for said arm adapted to determine the direction of its deflection when said strip is stressed.

14. A motion translating element comprising an elongated strip of springy material having a high width to thickness ratio, tension members extending from opposite edges of the strip adjacent opposite ends thereof, said tension members being non-rotatably joined with said strip, said strip being warpable when tension is applied to said members at a substantial angle to the longitudinal axis of said strip, and an arm extending outwardly of said strip from an end thereof at a substantial angle to said axis.

15. A motion translating device comprising, a thin strip of springy material substantially longer than it is wide, a first tension member extending laterally of the strip at one end thereof, a second tension member extending laterally of the strip at the other end thereof and oppositely to said first tension member, at least one of said tension members being non-rotatably joined to said strip and having substantial width at its junction therewith, and means in the device for applying stress to said strip through said tension members at a substantial angle to the longitudinal axis of the strip to produce warping thereof, whereby the primary motion applied to said unstressed strip results in secondary motion in the form of warping of the strip out of its unstressed plane.

16. A snap action device comprising, a thin strip of springy material substantially longer than it is wide, a first tension member extending laterally of the strip at one end thereof, a second tension member extending laterally of the strip at the other end thereof and oppositely to said first tension member, at least one of said tension members being non-rotatably joined to said strip and having substantial width at its junction therewith, means in said device for applying stress to said strip through said tension members at a substantial angle to the longitudinal axis of the strip to produce warping thereof out of the plane of the unstressed strip, and means in said device for applying primary motion to the warped strip to cause it to reverse the direction of warp, whereby secondary motion results from such reversal.

17. A motion translating element comprising an elongated strip of springy material having a high width-to-thickness ratio, integral tension members extending from opposite edges of the strip adjacent opposite ends thereof, said strip being warpable when tension is applied to said members at a substantial angle to the longitudinal axis of said strip, and an arm extending outwardly of said strip from an end thereof at a substantial angle to said axis.

18. A motion translating element formed from a thin sheet of springy material and comprising a unitary plane structure including a pair of oppositely extending loops having a common leg constituting the longer side of each loop, the other shorter legs of the loops terminating adjacent the middle of said common leg, and an arm extending outwardly of the closed end of a loop at a substantial angle to the longitudinal axis of said common leg, said legs having a high width-to-thickness ratio, said shorter legs acting as a means for applying tension to the ends of said common leg at a substantial angle to its longitudinal axis to warp the common leg and impart motion to said arm.

19. A motion translating and amplifying device comprising a thin flat strip of springy material having integral tension members extending outwardly from opposite edges at opposite ends of said strip, the junctions of said strip and said members being of substantial width, means for mounting said strip adapted to apply a constant tension to said members to warp said strip out of its normal plane in one direction, means adapted to press against said strip to cause it to snap from its thus mounted warped position to a warped position in the opposite direction, and an arm carried by said strip adjacent one of its ends adapted to be moved by the warping of said strip.

20. A motion translating and amplifying device comprising a thin flat strip of springy material having integral tension members extending outwardly from opposite edges at opposite ends of said strip, the junctions of said strip and said members being of substantial width, said members being looped back along the sides of said strip so as to lie on a line passing through its center at right angles to its longitudinal axis, an arm extending outwardly from one end of said strip at a substantial angle to said axis, and means for applying tension to said members to produce warping of the strip and movement of said arm.

LYNDON W. BURCH.
HADLEY K. BURCH.

REFERENCES CITED

The following references are of record in the file of this patent:

UNITED STATES PATENTS

| Number | Name | Date |
| --- | --- | --- |
| 345,767 | Buckley | July 20, 1886 |
| 2,189,996 | Riche | Feb. 13, 1940 |
| 2,289,061 | Mertler | July 7, 1942 |
| 2,526,850 | Charbonneau | Oct. 24, 1950 |

FOREIGN PATENTS

| Number | Country | Date |
| --- | --- | --- |
| 1,998 | Great Britain | 1858 |